(12) United States Patent
LaBarre et al.

(10) Patent No.: US 7,487,861 B2
(45) Date of Patent: Feb. 10, 2009

(54) ELEVATOR TRAFFIC CONTROL

(75) Inventors: Robert LaBarre, Willington, CT (US); David J. Sirag, Jr., Ellington, CT (US)

(73) Assignee: Otis Elevator Company, Farmington, CT (US)

(*) Notice: Subject to any disclaimer, the term of this patent is extended or adjusted under 35 U.S.C. 154(b) by 516 days.

(21) Appl. No.: 10/564,865

(22) PCT Filed: Aug. 6, 2003

(86) PCT No.: PCT/US03/24556

§ 371 (c)(1),
(2), (4) Date: Jan. 17, 2006

(87) PCT Pub. No.: WO2005/016811

PCT Pub. Date: Feb. 24, 2005

(65) Prior Publication Data

US 2006/0196734 A1   Sep. 7, 2006

(51) Int. Cl.
*B66B 1/20* (2006.01)
(52) U.S. Cl. ............................ 187/383; 187/247
(58) Field of Classification Search ......... 187/380–388, 187/391, 393, 247
See application file for complete search history.

(56) References Cited

U.S. PATENT DOCUMENTS

| | | | |
|---|---|---|---|
| 2,688,383 A | 9/1954 | Eames | |
| 3,857,465 A | 12/1974 | Iwasaka et al. | |
| 4,007,812 A | 2/1977 | Nelson, Jr. | |
| 4,063,620 A * | 12/1977 | Mandel et al. | 187/387 |
| 4,401,190 A | 8/1983 | Bittar | |
| 4,463,834 A | 8/1984 | Polis et al. | |
| 4,691,808 A | 9/1987 | Nowak et al. | |
| 4,792,019 A | 12/1988 | Bittar et al. | |
| 5,092,430 A | 3/1992 | Goto et al. | |
| 5,183,981 A | 2/1993 | Thangavelu | |
| 5,285,028 A | 2/1994 | Umeda et al. | |
| 5,317,114 A | 5/1994 | Pullela et al. | |
| 5,460,245 A | 10/1995 | Bittar | |
| 5,480,005 A | 1/1996 | Bittar | |
| 5,480,006 A | 1/1996 | Kameli et al. | |
| 5,511,634 A | 4/1996 | Bahjat et al. | |
| 5,644,110 A | 7/1997 | Bahjat et al. | |

(Continued)

FOREIGN PATENT DOCUMENTS

EP   0 727 381 A1   8/1996

(Continued)

OTHER PUBLICATIONS

PCT International Search Report relating to PCT/US03/24556 filed Aug. 6, 2003.

(Continued)

*Primary Examiner*—Jonathan Salata
(74) *Attorney, Agent, or Firm*—Carlson, Gaskey & Olds

(57) ABSTRACT

An elevator system includes a plurality of cars (22-30) that are capable of serving a plurality of floors (2-17). A controller (42) groups the floors into a plurality of sectors (S1-S4). The controller (42) assigns a particular car to a particular sector. The sectors include at least one sector that has at least one floor that is not contiguous with the other floors in that sector.

20 Claims, 4 Drawing Sheets

U.S. PATENT DOCUMENTS

| | | | |
|---|---|---|---|
| 5,719,360 A | 2/1998 | Davis et al. | |
| 5,831,226 A | 11/1998 | Hattori et al. | |
| 5,883,343 A * | 3/1999 | MacDonald et al. | 187/383 |
| 5,969,304 A | 10/1999 | Barker et al. | |
| 6,601,678 B2 | 8/2003 | Kostka et al. | |
| 7,025,180 B2 * | 4/2006 | Wyss et al. | 187/383 |
| 7,258,203 B2 * | 8/2007 | De Jong et al. | 187/383 |

FOREIGN PATENT DOCUMENTS

| | | |
|---|---|---|
| EP | 0 810 176 B1 | 12/1997 |

OTHER PUBLICATIONS

Notification of Transmittal of International Preliminary Examination Report dated Jan. 6, 2005.

* cited by examiner

ELEVATOR TRAFFIC CONTROL

FIELD OF THE INVENTION

This invention generally relates to controlling elevator traffic flow. More particularly, this invention relates to grouping floors into sectors and assigning particular cars to each sector.

DESCRIPTION OF THE RELATED ART

Elevator systems often include a plurality of elevator cars that each are capable of serving many floors or all of the floors within a building. In many instances, there are certain times during the day when the flow or volume of traffic on the elevator system is greatly increased compared to others. Various techniques have been developed to maximize the performance of the elevator system to improve the handling capacity so that elevator passengers receive prompt service.

One such technique is shown in U.S. Pat. No. 5,183,981, where groups of floors within the building are grouped into contiguous sectors and particular elevator cars are assigned to each sector. The sectoring concept has been shown to provide significant improvement in handling capacity. In some instances the improvement is on the order of fifty percent. Other techniques have been developed to reduce the number of stops of an elevator car to improve handling capacity.

Those skilled in the art are always striving to make improvements. This invention provides various approaches for grouping floors into sectors to enhance the handling capacity of an elevator system.

SUMMARY OF THE INVENTION

In general terms, this invention is an elevator system handling capacity enhancement. This invention includes grouping floors into sectors that include at least one sector having at least one floor that is not contiguous with at least one other floor in that sector.

A system designed according to this invention includes a plurality of elevator cars, each capable of servicing a plurality of floors. A controller groups the floors into sectors with at least one sector having at least one floor not contiguous with at least one other floor in that sector. At least one of the cars is assigned to each one of the sectors.

The techniques of this invention minimize the average number of stops and significantly reduce the average reversal floor of an elevator car, which greatly enhances the handling capacity of the system The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
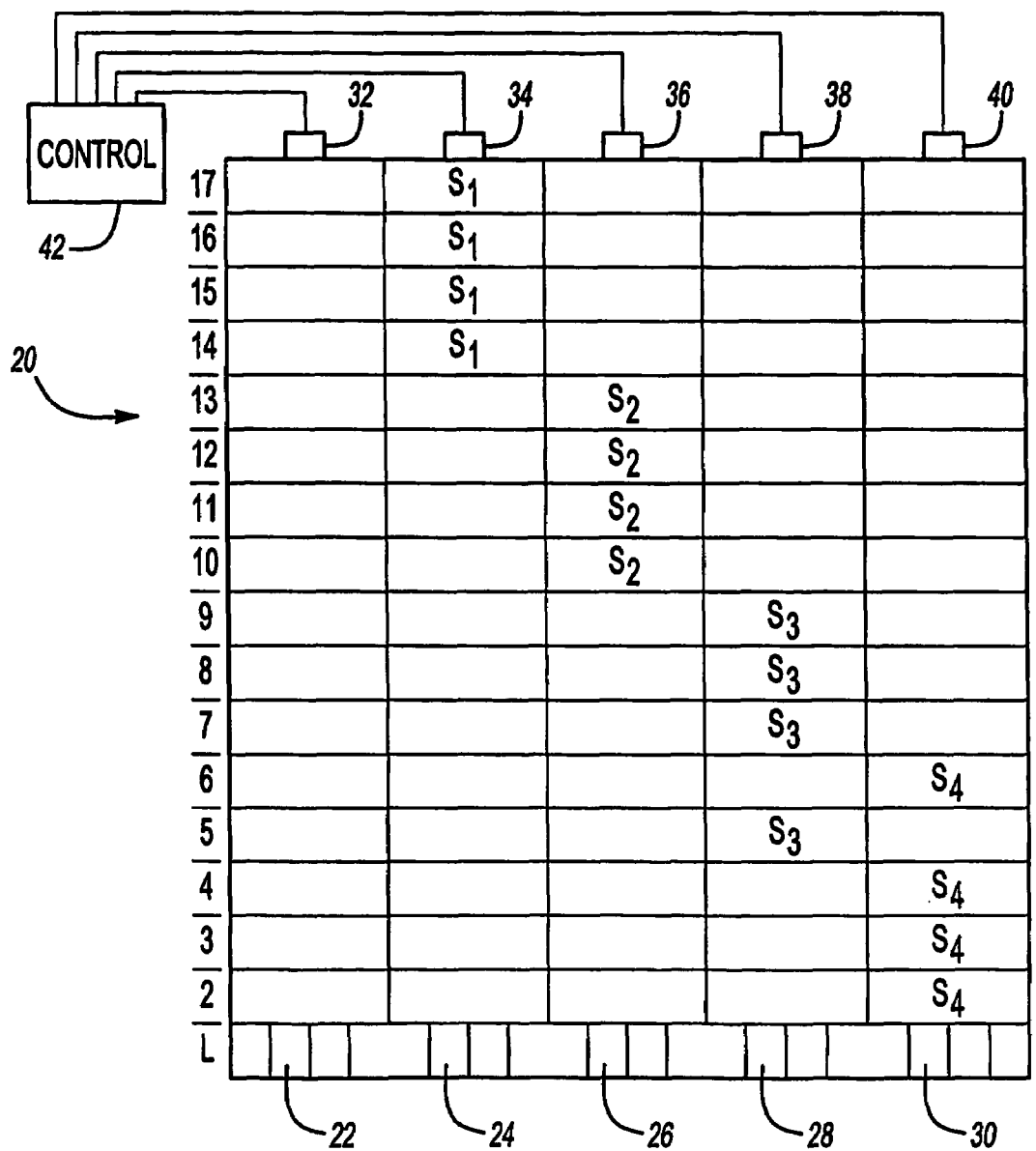
FIG. 1 schematically illustrates an elevator system incorporating a sector arrangement designed according to an example embodiment of this invention.

FIG. 1 schematically illustrates an elevator system 20 where a plurality of elevator cars 22, 24, 26, 28 and 30 are capable of servicing a plurality of floors within a building. In the illustrated example, the elevator cars are shown at a lobby level L. The floors that are serviced by the cars are labeled 2-17 in the drawing. The floor numbers are for illustration purposes and do not necessarily correspond to actual building level numbers. Moreover, this invention is not limited to any particular number of elevator cars or floors within a building. Those skilled in the art who have the benefit of this description will realize that the example illustration is one of many arrangements that can incorporate the techniques of this invention.

Each elevator car is moved through a hoistway by a machine (not illustrated) that is controlled by a controller. In the illustrated example the elevator car 22 is controlled by a controller 32. Similarly, the cars 24, 26, 28 and 30 have controllers 34, 36, 38 and 40, respectively, associated with them. The individual car controllers operate in a known manner to cause desired movement of the cars within the building to service landings responsive to requests made by passengers using hall call buttons or buttons on a car operating panel, for example.

The illustrated system also includes a main controller 42 that communicates with each of the individual car controllers 32-40. The main controller 42 determines information regarding traffic flow patterns for selectively assigning individual ones of the cars 22-30 to particular groupings or sectors of floors within the building to achieve enhanced system capacity. There are various known techniques for monitoring elevator system traffic flow within a building and for deciding how many floors to include in a sector and how to assign cars to a particular grouping of floors. Any of those known techniques can be used by the controller 42 to achieve that portion of the elevator system operation.

This invention provides a unique way of grouping the floors within the building into sectors so that at least one of the cars 22-30 can be assigned to a specific sector, which enhances the handling capacity of the elevator system, especially during more busy times of the day.

It is known, as described in various patents owned by the assignee of this invention, to group floors into a strictly contiguous arrangement where contiguous sectors each contain floors that are all contiguous with another floor in the sector and the sectors are all contiguous with each other. Such an arrangement is referred to in this description as strictly contiguous. This invention includes several grouping techniques that do not result in a strictly contiguous arrangement, but provides a nearly contiguous arrangement. As will become apparent below, some example implementations of this invention include some sectors that contain all contiguous floors, some sectors that are contiguous with other sectors, or a combination of the two, but none of them have a strictly contiguous arrangement.

FIG. 1 illustrates one example sectoring arrangement designed according to this invention. In this example, each sector includes four floors within the building. The car 24 is assigned to a first sector $S_1$, which in this example includes floors 14, 15, 16 and 17. The car 26 is assigned to a second sector $S_2$, which includes the floors 10, 11, 12 and 13. If the first and second sectors were the only sectors within the building, they could be considered contiguous sectors. In this example there are two more sectors, which make the overall sectoring arrangement non-contiguous. A third sector $S_3$, which includes floors 5, 7, 8 and 9, is serviced by the car 28. A fourth sector $S_4$ is serviced by the car 30. The fourth sector includes floors 2, 3, 4 and 6. As can be appreciated from FIG. 1, floors 5 and 6 are not contiguous with other floors within their respective sectors. Accordingly, the overall grouping of floors into sectors is non-contiguous.

One example technique of arranging the sectors as shown in the illustration of FIG. 1 includes initially arranging the floors into preliminary, contiguous sectors and then changing one floor from one sector with one floor from another sector. In the illustrated example, floors 5 and 6 were effectively swapped between the third and fourth sectors to achieve the illustrated arrangement.

Figure 2:
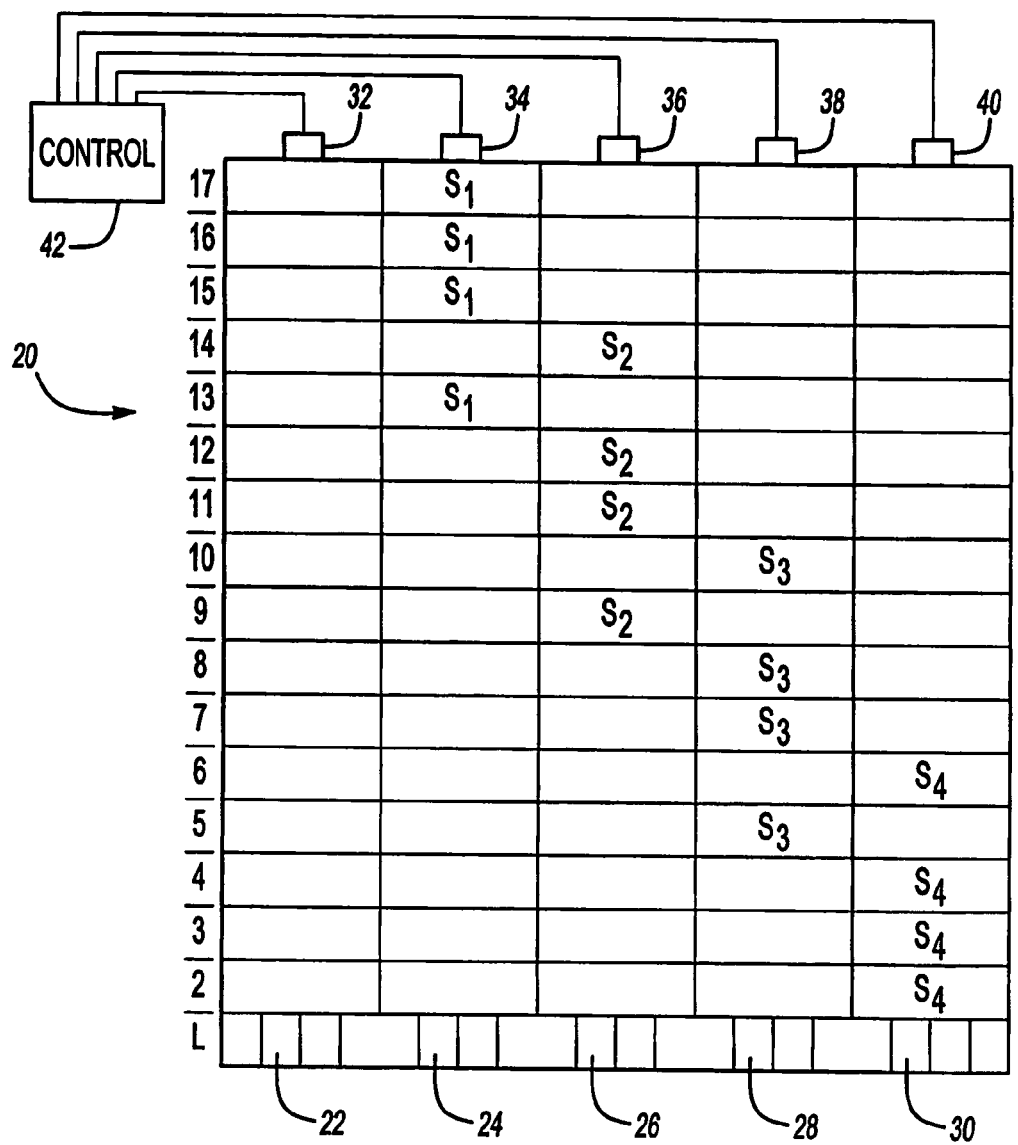
FIG. 2 schematically illustrates an elevator system incorporating a sector arrangement designed according to another example embodiment of this invention.

Swapping floors between contiguous sectors is one technique designed according to this invention. It is possible to swap floors as many as N times, where N is an integer that is less than the total number of floors serviced by the cars in the elevator system. FIG. 2 illustrates an arrangement where N=3. In the illustrated example, the first through fourth sectors originally could be grouped to be contiguous followed by a swap of floors between the first and second sectors, the second and third sectors and the third and fourth sectors. Such an arrangement as illustrated in FIG. 2 is the result.

Although the sectors are not contiguous, the average reversal floor for each car is not significantly increased compared to an arrangement where all of the sectors are contiguous. Accordingly, the example of FIG. 2 still presents a significant improvement of the handling capacity compared to systems where no sectoring is applied. To maximize the handling capacity using this technique, it is desirable to minimize the "upward movement" (i.e., during the swapping of floors) of the "upward moving" floor. For example, it is better to swap floors 5 and 6 between the third and fourth sectors than it would be to swap floors 5 and 8 as the floor moving upward from the fourth sector would have to "move" an additional two floors upward during the swap.

In one example, the interchange of floors between sectors does not include all possible two-floor interchanges between otherwise contiguous configurations. In this example, the non-contiguous configurations include N interchanges applied to a preliminary, contiguous configuration, where N is the smallest integer greater than or equal to half the average sector size over all sectors in a building where the size of the sector is the number of floors.

Symbolically, assume a building has T floors and S sectors, with sector sizes of $f_1, f_2, \ldots, f_s$. Define $F=(f_1+f_2+\ldots+f_s)/S$. According to this example, a nearly contiguous arrangement would be any sector grouping that is no more than the smallest integer greater than or equal to F/2 away from a contiguous sector grouping.

One example includes a building having twenty floors (i.e., T=20). There are four sectors (i.e., S=4). The number of floors f within the four sectors are as follows: $f_1$ =5, $f_2$=6, $f_3$=4, $f_4$=7. Accordingly, F=(5+6+4+7)/4=5.5. F/2=2.75, therefore, the smallest integer greater than or equal to 2.75 is 3. In this example, any arrangement that is not more than three interchanges from a fully contiguous arrangement of sectors satisfies the example criteria. In this example, there are overlapping sectors. In instances where there are non-overlapping sectors, F=T/S.

Another technique designed according to this invention includes using top-weighted sectoring. This is shown, for example, in FIG. 3. In this example there are four sectors, $S_1$, $S_2$, $S_3$ and $S_4$, with four floors per sector. This technique can be implemented by following the strategy where there are S sectors and F floors per sector. Grouping the top F-1 floors with the $S^{th}$ floor establishes a sector. The next sector includes the next highest unassigned F-1 floors and the S-1$^{th}$ floor (e.g., using the highest unassigned F-1 floors with the (S-m)$^{th}$ floor, where m is the number of already established sectors out of the total S sectors). This process is repeated until all floors are allocated into a sector.

Figure 3:
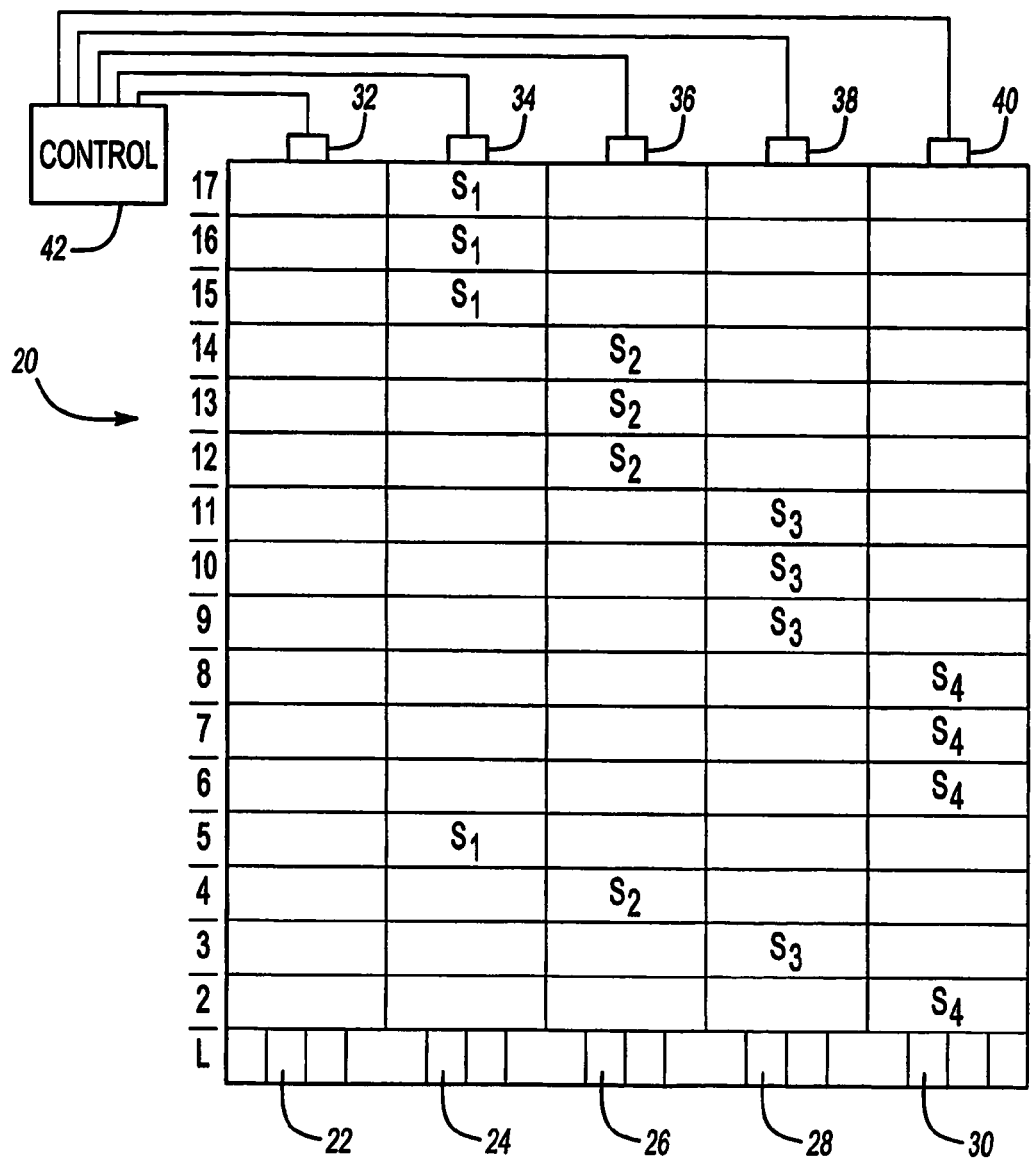
FIG. 3 schematically illustrates an elevator system incorporating a sector arrangement designed according to another example embodiment of this invention.

In the example of FIG. 3, there are four sectors (S=4) and four floors per sector (F=4). The first sector $S_1$ is assigned to the top three (i.e., 4−1=3) floors and the fourth floor (i.e., floor 5 in the illustration). The second sector $S_2$ includes the next available three top floors and the floor beneath the fourth floor (i.e., floor 4 in the illustration). Similarly, the third and fourth sectors are assigned in order.

Another technique designed according to this invention is referred to as modulous sectoring and one example implementation is referred to as K-modulous sectoring. This technique includes grouping floors into sectors based on an equivalence modulo K, where K is some positive integer greater than or equal to two. Generally, the building is divided into K preliminary, contiguous sectors and then each of those sectors are divided into M non-contiguous subsectors, resulting in K*M non-contiguous sectors.

An example arrangement using K modulous sectoring where K=2 results in even-odd assignments for sectors. In one example, all even numbered floors would be considered one sector and all odd numbered floors would be grouped into a second sector. For example, one car could be assigned to the even numbered floors from a fixed beginning floor to a selected ending floor for a sector. Another car could be assigned to the odd numbered floors between the same beginning and ending floors.

Figure 4:
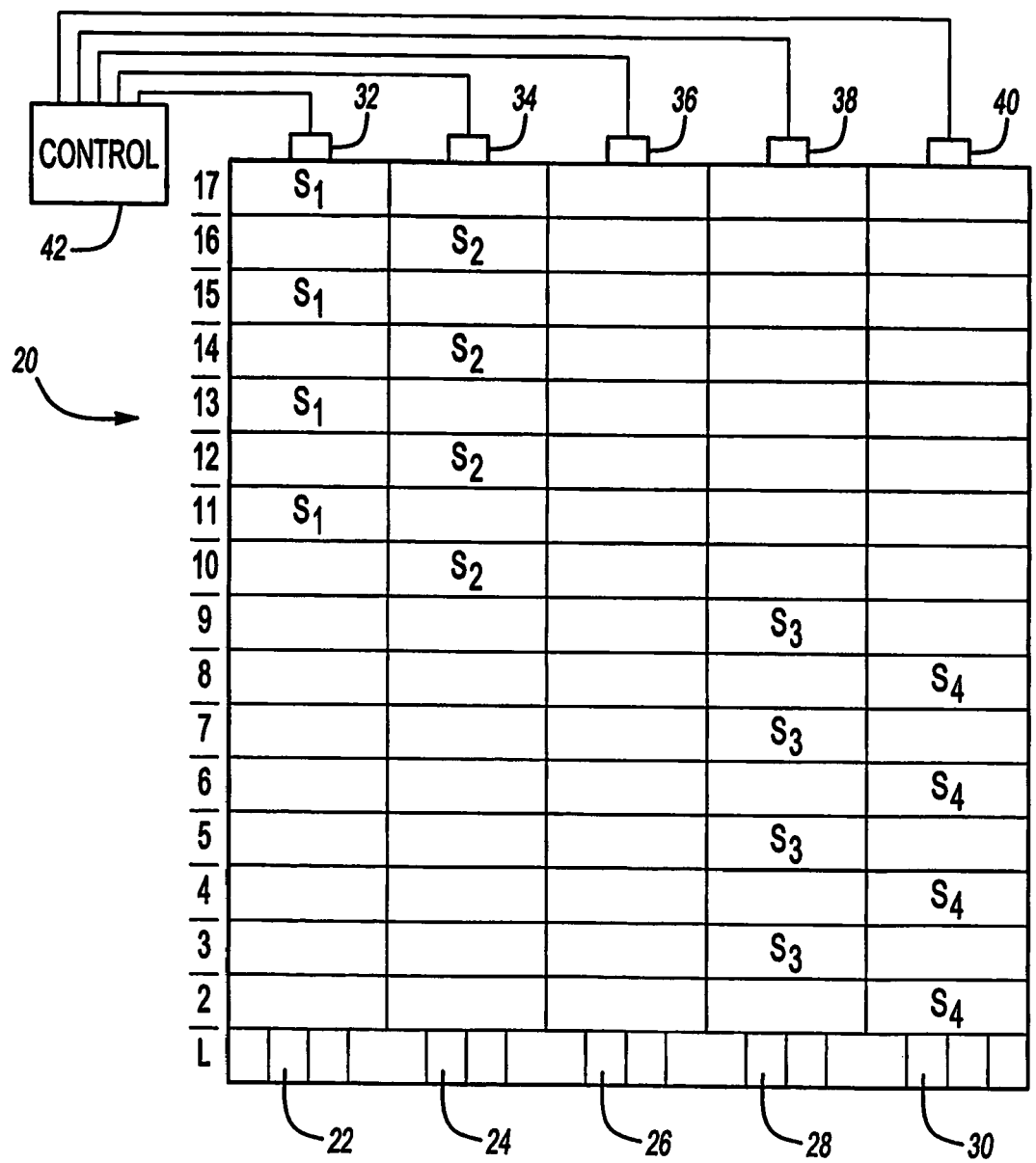
FIG. 4 schematically illustrates an elevator system incorporating a sector arrangement designed according to another example embodiment of this invention.

In the example of FIG. 4, the building is originally divided into two preliminary, contiguous sectors. Floors 2-9 are one preliminary sector and floors 10-17 are another preliminary sector. Each of the preliminary sectors are then subdivided into sectors. In the example of FIG. 4, the two preliminary sectors are divided by two so that four sectors $S_1$-$S_4$ result. In the illustration of FIG. 4, the car 22 is assigned to the first sector $S_1$, which includes floors 17, 15, 13 and 11. The car 30 is assigned to the fourth sector $S_4$, which includes floors 8, 6, 4 and 2. In that example, K and M equal two.

Generally speaking, the K-modulous grouping technique assigns cars to cover floors that are evenly spaced from each other (i.e., every K$^{th}$ floor between a selected starting floor and a selected ending floor). This technique can be described using the following notation.

Assume an example where a building has C elevator cars and T floors. The floors are originally grouped into preliminary, contiguous sectors of contiguous floors where the j$^{th}$ contiguous sector begins at floor (start)$_j$ and ends at floor (end)$_j$. Assume that t of the C cars will serve the j$^{th}$ preliminary, contiguous sector. Then, a K-modulus sectoring dispatching grouping and car assignment entails the following:

t is greater than or equal to K;

the car $C_i$, where i equals 1,2, ..., has an assigned subchannel consisting of those floors where i = floor number (mod K), restricted to being between floors (start)$_j$ and (end)$_j$; and if t is greater than K, the cars numbered greater than K are assigned to handle the same floors in the sector if and only if i ≡j (mod K).

It should be noted that in an example where K=1, the result would provide contiguous sectors.

As a numerical example, assume there are twelve cars in a building and 40 floors (i.e., C=12 and T=40). Assume the building floors are grouped into four preliminary, contiguous sectors with the first sector including floors 1-10, the second sector including floors 11-28, the third sector including floors 29-34 and the fourth sector including floors 34-40. Let j=2, so that we consider the second sector (i.e., floors 11-28). This provides $(start)_{2}=11$ and $(end)_{2}=28$. Assume further that six of the twelve cars will service this particular preliminary sector ($t=6$).

In an example including the just-described four preliminary sectors and where $K=3$, car $C_1$ handles calls to and from floors 13, 16, 19, 22, 25 and 28 as each of these floor numbers have a remainder of 1 (the subscript of the car number) when divided by three (which is the value of K). Similarly, the car $C_2$ handles calls to and from floors 11, 14, 17, 20, 23 and 26. The car $C_3$ handles calls to and from floors 12, 15, 18, 21, 24 and 27. The floors assigned to each car establish non-contiguous sectors.

In this example, t is greater than K so that car $C_4$ handles the same floors as car $C_1$ since $4=1 \pmod 3$. Similarly, the car $C_5$ handles the same floors as car $C_2$ and car $C_6$ handles the same floors as $C_3$.

In one example, the cars are assigned or labeled in a dynamic fashion such that, for example, the car 24 in FIG. 4 is not always car $C_f$. Each sector for a car is effectively based upon equally spaced floors within a preliminary, contiguous sector.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling elevator car travel, comprising:
grouping floors into preliminary, contiguous sectors; and
rearranging the preliminary sectors into a plurality of sectors where at least one of the sectors includes at least one floor that is not contiguous with at least one other floor in the one sector.

2. The method of claim 1, including assigning at least one elevator car to each sector.

3. The method of claim 1, including grouping some of the floors into at least two sectors contiguous with each other, the two sectors having every floor contiguous with another floor in the sector, respectively.

4. The method of claim 1, including changing at least one floor from at least one preliminary sector with at least one floor from another preliminary sector.

5. The method of claim 4, wherein there are N changes, where N is a smallest integer greater than or equal to ($\frac{1}{2}$) (the average number of floors per sector).

6. The method of claim 1, including grouping floors so that each sector has at least one floor contiguous with a floor from another sector and a remaining number of floors contiguous with each other.

7. The method of claim 1, wherein there are S sectors and F floors per sector and grouping the floors sequentially into sectors such that each sector has a highest unassigned (F-1) floors and the $(S-m)^{th}$ floor, where m is the number of established sectors.

8. The method of claim 1, including grouping the floors into K preliminary, contiguous sectors and then rearranging each preliminary sector into M non-contiguous sectors, where K is greater than or equal to 2 and M is greater than or equal to 2.

9. The method of claim 1, including grouping the floors into K preliminary sectors and then rearranging each preliminary sector into K sectors having every $K^{th}$ floor in each sector, where K is an integer greater than or equal to 2.

10. The method of claim 8, wherein $K=2$ and a first sector has alternating floors with another sector.

11. The method of claim 1, wherein each of the sectors has at least one floor that is not contiguous with at least one other floor in the sector.

12. The method of claim 1, including using at least two of:
changing at least one floor from at least one preliminary sector with at least one floor from another preliminary sector;
grouping floors so that each sector has at least one floor contiguous with a floor from another sector and a remaining number of floors contiguous with each other;
grouping the floors sequentially into sectors such that each sector has a highest unassigned (F-1) floors and the $(S-m)^{th}$ floor, where there are S sectors, F floors per sector and m is the number of established sectors;
grouping the floors into K preliminary, contiguous sectors and then rearranging each preliminary sector into m non-contiguous sectors, where K is greater than or equal to 2 and m is greater than or equal to 2; and
grouping the floors into K preliminary sectors and then rearranging each preliminary sector into K sectors having every $K^{th}$ floor in each sector, where K is an integer greater than or equal to 2.

13. An elevator system, comprising:
a plurality of elevator cars, each capable of serving a plurality of floors; and
a controller that groups the floors into preliminary, contiguous sectors and then rearranges the preliminary sectors into sectors with at least one sector having at least one floor that is not contiguous with at least one other floor in the one sector.

14. The system of claim 13, wherein the controller changes at least one floor from one preliminary sector with at least one floor form another preliminary sector.

15. The system of claim 14, wherein there are N changes, where N is a smallest integer greater than or equal to ($\frac{1}{2}$) (the average number of floors per sector).

16. The system of claim 13, wherein there are S sectors, F floors per sector and the controller sequentially groups the floors into sectors in an order where a current grouping of floors includes the highest unassigned (F-1) floors and the $(S-m)^{th}$ floor, where m is the number of established sectors.

17. The system of claim 13, wherein the controller groups the floors into K preliminary, contiguous sectors and then rearranges each preliminary sector into M non-contiguous sectors, where K is greater than or equal to 2 and M is greater than or equal to 2.

18. The system of claim 13, wherein there are C cars and the controller groups the floors into K preliminary sectors, the controller then rearranges each preliminary sector into K sectors having every $K^{th}$ floor in each sector, where K is greater than or equal to 2.

19. The system of claim 13, wherein the controller groups the floors so that at least two of the sectors are contiguous with each other and the two contiguous sectors have every floor contiguous with another floor in each of the two sectors, respectively.

20. A method of controlling elevator car travel, comprising sequentially establishing a plurality of sectors by:
grouping floors into each of the sectors, sequentially, such that each sector has a highest unassigned (F-1) floors and the $(S-m)^{th}$ floor, where there are S total sectors, F floors per sector and m is the number of sectors established prior to the sector into which floors are being grouped.

* * * * *